US009827779B2

(12) United States Patent
Ando et al.

(10) Patent No.: US 9,827,779 B2
(45) Date of Patent: Nov. 28, 2017

(54) LIQUID EJECTING APPARATUS AND LIQUID SUPPLY METHOD

(71) Applicant: SEIKO EPSON CORPORATION, Tokyo (JP)

(72) Inventors: Masaaki Ando, Nagano (JP); Jun Shimazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 267 days.

(21) Appl. No.: 14/487,481

(22) Filed: Sep. 16, 2014

(65) Prior Publication Data

US 2016/0075145 A1 Mar. 17, 2016

(30) Foreign Application Priority Data

Sep. 17, 2013 (JP) ................................ 2013-191457

(51) Int. Cl.

| | |
|---|---|
| ***B01D 19/00*** | (2006.01) |
| ***B41J 2/19*** | (2006.01) |
| ***B41J 2/175*** | (2006.01) |
| ***B41J 29/38*** | (2006.01) |

(52) U.S. Cl.

CPC ................ *B41J 2/19* (2013.01); *B41J 2/175* (2013.01); *B41J 29/38* (2013.01)

(58) Field of Classification Search

CPC ... B41J 2/19; B41J 2/175; B41J 29/38; B01D 19/00–19/0495

USPC ............................... 95/156–186; 96/155–220

See application file for complete search history.

(56) References Cited

U.S. PATENT DOCUMENTS

| | | | | |
|---|---|---|---|---|
| 6,190,008 B1 * | 2/2001 | Iwashita | .................... B41J 2/19 347/92 |
| 2012/0194598 A1 * | 8/2012 | Fujisawa | ................ B41J 2/2114 347/16 |

FOREIGN PATENT DOCUMENTS

| | | | | | |
|---|---|---|---|---|---|
| GB | 844185 | A | * | 8/1960 | ......... B01D 19/0063 |
| JP | 1-9222 | U | | 1/1992 | |
| JP | 4-9222 | U | * | 1/1992 | ............. B23D 79/00 |
| JP | 11-244607 | A | | 9/1999 | |
| JP | 2007-130907 | A | | 5/2007 | |
| JP | 2010-194423 | A | | 9/2010 | |
| JP | 2011-104508 | A | | 6/2011 | |
| JP | 2013-67115 | A | | 4/2013 | |
| WO | 2011/136079 | A1 | | 11/2011 | |

* cited by examiner

*Primary Examiner* — T. Bennett McKenzie

(74) *Attorney, Agent, or Firm* — Global IP Counselors, LLP

(57) ABSTRACT

There are provided a head ejecting a liquid, a retaining section retaining the liquid, a degassing section with a degassing unit, a first supply flow path flowing the liquid from the retaining section to the degassing section, and a second supply flow path flowing the liquid degassed in the degassing section to the head. The degassing section further includes a degassing flow path having the degassing unit to flow the liquid while reducing pressure, a bypass flow path flowing the liquid without reducing the pressure, a branching section dividing the liquid flowing in the first supply flow path into the degassing flow path and the bypass flow path, and a joining section joining the liquid flowing in the degassing flow path and the liquid flowing in the bypass flow path to flow in the second supply flow path.

6 Claims, 4 Drawing Sheets

LIQUID EJECTING APPARATUS AND LIQUID SUPPLY METHOD

CROSS-REFERENCE TO RELATED APPLICATIONS

This application claims priority to Japanese Patent Application No. 2013-191457 filed on Sep. 17, 2013. The entire disclosure of Japanese Patent Application No. 2013-191457 is hereby incorporated herein by reference.

BACKGROUND

Technical Field

The invention relates to a liquid ejecting apparatus which supplies a liquid, from which gaseous components such as bubbles are removed, to nozzles and ejects the liquid from the nozzles and to a method for supplying the liquid.

Related Art

In the prior art, liquid ejecting apparatuses, such as printers, which eject liquids such as inks from nozzles are known. In such apparatuses, when gaseous components such as bubbles are mixed into the liquid, there are times when ejection defects occur such as it not being possible to appropriately eject the liquid from the nozzles. Therefore, in the apparatus, gaseous components such as bubbles which are included in the ink are removed, in other words, degassing is carried out, for example, by providing a degassing section where degassing units are interposed with regard to an ink supply flow path which supplies ink to an ink jet head (see JP-A-2007-130907 (Patent Literature 1), for example). In addition, Patent Literature 1 proposes a method where a plurality of degassing units are connected in parallel in order to reduce loss in pressure in the degassing section.

SUMMARY

However, it is difficult to sufficiently reduce loss in pressure in the degassing section simply by lining up the degassing units in parallel.

The present invention is conceived in light of the problems described above, and an advantage is to provide a technique where it is possible to reduce loss in pressure in a degassing section.

A liquid ejecting apparatus according to an aspect of the invention includes a head ejecting a liquid, a retaining section retaining the liquid, a degassing section with a degassing unit, a first supply flow path flowing the liquid from the retaining section to the degassing section, and a second supply flow path flowing the liquid degassed in the degassing section to the head. The degassing section further includes a degassing flow path having the degassing unit to flow the liquid while reducing pressure, a bypass flow path flowing the liquid without reducing the pressure, a branching section dividing the liquid flowing in the first supply flow path into the degassing flow path and the bypass flow path, and a joining section joining the liquid flowing in the degassing flow path and the liquid flowing in the bypass flow path to flow in the second supply flow path.

In addition, a liquid supply method according to an aspect of the invention has characteristics of dividing a liquid supplied from a retaining section to flow in a degassing flow path having a degassing unit that reduces pressure and a bypass flow path in which the liquid flows without reducing the pressure, and joining the liquid flowing from the degassing flow path and the liquid flowing from the bypass flow path to supply the liquid to a head.

The liquid which is supplied from the retaining section is split into the degassing flow path and the bypass flow path at the degassing section and the liquid which flows in the degassing flow path is degassed by pressure being reduced by the degassing unit while the liquid which flows in the bypass flow path flows without any changes without being degassed since the pressure is not reduced. Then, the degassed liquid which flows from the degassing flow path and the non-degassed liquid which flows from the bypass flow path join up and are supplied to the head. In this manner, loss in pressure is reduced in an efficient manner in the degassing section by providing the bypass flow path while also degassing the liquid using the degassing unit.

Here, the number of degassing flow path may be configured to be greater than the number of bypass flow path and it is possible to effectively reduce the amount of gas which is included in the liquid, in other words, to increase the degree of degassing, while maintaining a low loss in pressure due to this. In particular, in a case where the degassing flow path and the bypass flow path are both the same (the cross sectional area of the flow paths and the lengths of the flow paths are the same), it is possible to improve the degassing capacity by increasing the number of degassing flow paths. For example, it is possible to obtain a degassing effect while suppressing loss in pressure by providing a plurality of degassing flow paths while providing one bypass flow path.

However, since the degree to which degassing is to be carried out by the degassing section is different depending on the liquid, it is desirable that the number of degassing flow path be differentiated according to the liquid. For example, for a liquid which includes a substance with high sedimentation, for example, white ink, it is necessary to carry out sufficient stirring before supplying the liquid to the retaining section or while the liquid is in the retaining section and it is easy for bubbles to be included in the liquid during stirring. As a result, in the degassing section which degasses white ink, it is desirable that sufficient degassing be achieved by the number of degassing flow paths being comparatively large.

In addition, it is desirable that the degassing flow path and the bypass flow path be configured such that the liquid guided from the branching section flows upward from below in the vertical direction. With such a configuration, it is easy for bubbles in the liquid to be separated by being gathered at the upper side of the flow path and it is possible to achieve degassing.

Furthermore, in a case where the liquid is an ultraviolet curable ink which is cured using ultraviolet rays, there are times when foreign matter is generated when oxygen in the liquid is excessively reduced by the degassing as described above. However, in the aspect of the present invention, a portion of the liquid which is supplied from the retaining section is bypassed through the bypass flow path and joins up with the liquid which is degassed by the degassing unit. Since oxygen is included in the liquid which flows in the bypass flow path and the amount of oxygen which is dissolved in the liquid which is supplied to the head is not excessively reduced, it is possible to suppress foreign matter from being generated.

BRIEF DESCRIPTION OF THE DRAWINGS

Referring now to the attached drawings which form a part of this original disclosure.

DETAILED DESCRIPTION OF EMBODIMENTS

Figure 1:
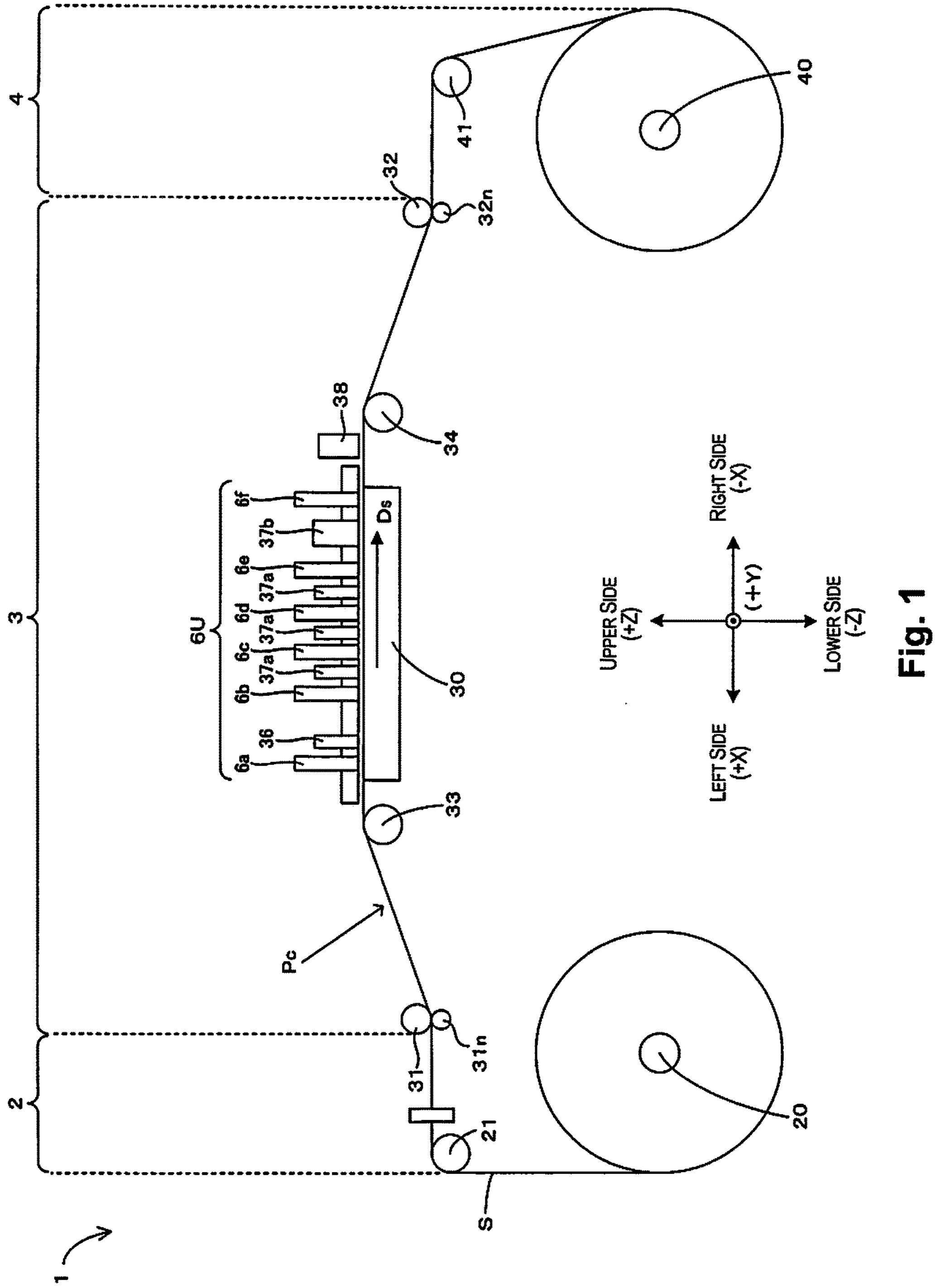
FIG. 1 is a front surface diagram schematically illustrating a configuration of a printer where it is possible to apply the present invention.

FIG. 1 is a front surface diagram schematically illustrating a configuration of a printer where it is possible to apply the present invention. Here, a three-dimensional coordinate system which corresponds to the left and right direction X, the front and back direction Y, and the vertical direction Z of a printer 1 is adopted in FIG. 1 and the following diagrams in order to clarify arrangement relationships of each of the sections in the printer 1 as necessary.

As shown in FIG. 1, a feeding section 2, a processing section 3, and a winding section 4 are arranged in the printer 1 in the left and right direction. The feeding section 2 and the winding section 4 respectively have a feeding out shaft 20 and a winding shaft 40. Then, both ends of a sheet S (a medium) are wound around into the shape of a roll by the feeding section 2 and the winding section 4 and are stretched therebetween. After the sheet S is transported from the feeding shaft 20 to the processing section 3 along a transport path Pc which stretches out in this manner and undergoes an image recording process using a printing unit 6U, the sheet S is transported to the winding shaft 40. It is possible for the classification of the sheets S to be divided into paper and film. Here, in the following description, out of both surfaces of the sheet S, the surface on which an image is recorded is the front surface and the surface on the opposite side is the rear surface.

The feeding section 2 has the feeding shaft 20 around which an edge of the sheet S is wound and a driven roller 21 onto which the sheet S which is drawn out from the feeding shaft 20 is wound. The sheet S which is wound around the feeding shaft 20 is fed out to the processing section 3 through the driven roller 21 by the feeding shaft 20 being rotated.

The processing section 3 records an image on the sheet S using the printing unit 6U while supporting the sheet S, which is fed out from the feeding section 2, on a platen 30. In other words, the printing unit 6U has a plurality of heads 6*a* to 6*f* which line up along the front surface of the platen 30 and an image is recorded on the sheet S by the heads 6*a* to 6*f* ejecting ink onto the sheet S which is supported by the front surface of the platen 30. In the processing section 3, a front driving roller 31 and a rear driving roller 32 are provided on both sides of the platen 30 and the sheet S which is transported from the front driving roller 31 to the rear driving roller 32 is supported by the platen 30 and undergoes image printing.

Driven rollers 33 and 34 are provided on both sides on the left and right of the platen 30, and the sheet S, which is transported from the front driving roller 31 to the rear driving roller 32, is wound onto the driven rollers 33 and 34 from the rear surface side.

A nip roller 31*n* is provided with regard to the front driving roller 31. It is possible to perform reliable transporting of the sheet S using the front driving roller 31 by inserting the sheet S between the front driving roller 31 and the nip roller 31*n*.

In the same manner, a nip roller 32*n* is provided with regard to the rear driving roller 32.

In this manner, the sheet S which is transported from the front driving roller 31 to the rear driving roller 32 is transported in the transport direction Ds on the platen 30 while being supported by the platen 30. Then, in the processing section 3, the plurality of heads 6*a* to 6*f*, which eject ink using an ink jet system with regard to the front surface of the sheet S which is supported by the platen 30, line up in the transport direction Ds while facing the front surface of the platen 30. Nozzle rows are formed in each of the heads 6*a* to 6*f* by a plurality of nozzles being lined up in the form of a straight line in the Y direction which is orthogonal to the transport direction Ds and the nozzle rows are lined up in a plurality of rows to be spaced at intervals in the transport direction Ds. Accordingly, it is possible for each of the heads 6*a* to 6*f* to record a line image with a plurality of lines at the same time. Then, the heads 6*a* to 6*f* eject inks of corresponding colors using an ink jet system while facing the front surface of the sheet S which is supported by the platen 30 and being spaced with a slight clearance.

The heads 6*b* to 6*e* out of these heads form color images by respectively ejecting inks of yellow (Y), cyan (C), magenta (M), and black (K). In addition, the head 6*a* which is installed on the upstream side of the head 6*b* in the transport direction Ds (the left hand side in FIG. 1) ejects white (W) ink and prints a background (referred to below as a "background image") for the color images which are formed by the heads 6*b* to 6*e*. Furthermore, the head 6*f* which is installed on the downstream side of the head 6*e* in the transport direction Ds (the right hand side in FIG. 1) ejects transparent ink and the transparent ink is further ejected with regard to the color images and the background image.

In relation to this, ultraviolet (UV) ink (photocurable ink) which is cured by irradiating ultraviolet rays (light) is used as the ink. Therefore, the present embodiment is provided with a UV lamp 36 for the background image, UV lamps 37*a* and 37*b* for the color images, and a UV lamp 38 for the transparent ink. That is, the UV lamps 36, 37*a*, 37*b*, and 38 fix each of the inks to the sheet S by curing the inks.

In this manner, for example, color images with a background image which is coated by transparent ink are formed by appropriately executing ejecting and curing of ink with regard to the sheet S which is supported by the platen 30 in the processing section 3. Then, the sheet S where the color images are formed is transported to the winding section 4 by the rear driving roller 32.

The winding section 4 has the winding shaft 40 around which an end of the sheet S is wound and a driven roller 41 onto which the sheet S which is transported to the winding shaft 40 is wound. The sheet S is wound around the winding shaft 40 through the driven roller 41 by the winding shaft 40 being rotated.

Figure 2:
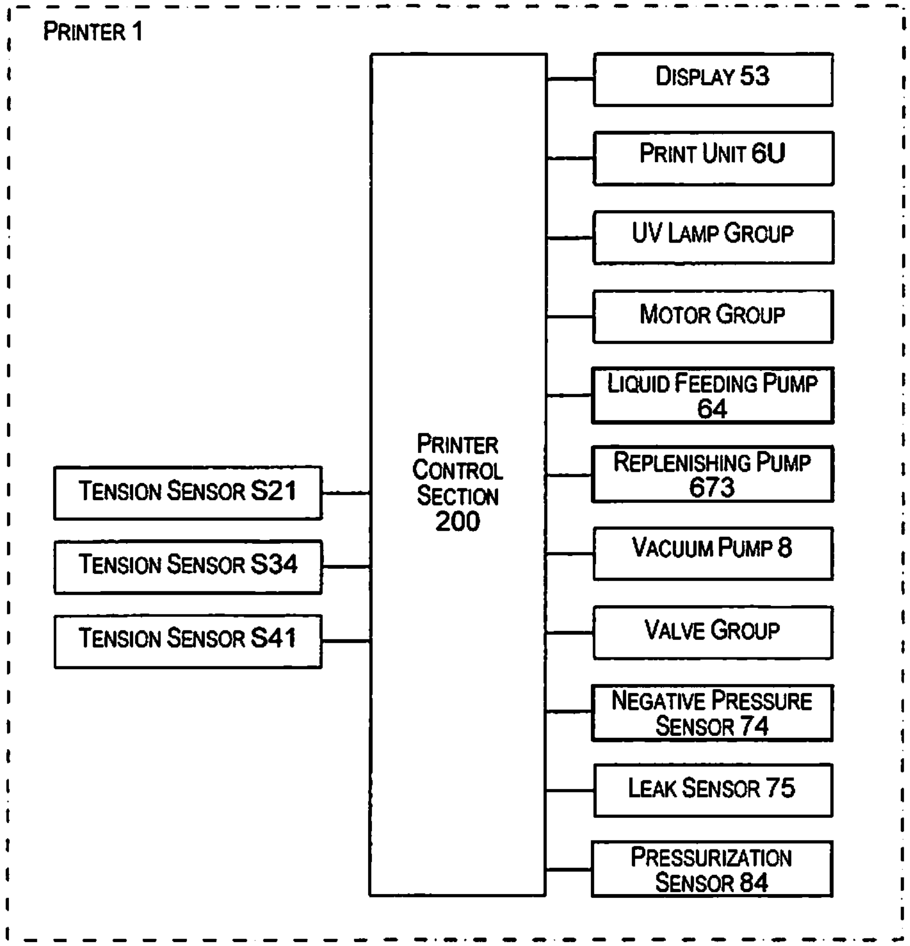
FIG. 2 is a block diagram schematically illustrating an electrical configuration which controls the printer shown in FIG. 1.

The above is a summary of the mechanical configuration of the printer 1. Next, the electrical configuration which controls the printer 1 will be described. FIG. 2 is a block diagram schematically illustrating an electrical configuration which controls the printer shown in FIG. 1. The printer 1 is provided with a printer control section 200 which controls each of the sections of the printer 1 according to instructions from an external host computer or the like.

Then, the heads, the UV lamps, and each of the sections of the apparatus in the sheet transporting system and the ink supply system are controlled by the printer control section 200. The details of controlling the printer control section 200 with regard to each of the sections of the apparatus are as follows.

The printer control section 200 governs the functions which control transporting of the sheet S which was described in detail using FIG. 1. In other words, out of the members which configure the sheet transporting system, motors are respectively connected with the feeding shaft 20, the front driving roller 31, the rear driving roller 32, and the winding shaft 40. Then, the printer control section 200 controls transporting of the sheet S by controlling the speed and torque of each of the motors while rotating the group of motors.

Furthermore, the printer control section 200 controls the operation of the heads 6*a* to 6*f* of the printing unit 6U and the operation of the UV lamps 36, 37*a*, 37*b*, and 38 according to the transport status of the sheet S on the platen 30.

In addition, the printer 1 is provided with a display 53 as a user interface. The display 53 is configured by a touch panel and also fulfils an input function where input from a user is received in addition to a display function where display is performed with regard to the user. Then, the printer control section 200 displays various types of information and instructions on the display 53 and controls each of the sections of the printer 1 in accordance with input from the user.

The above is an outline of the electrical configuration of the printer 1. Here, the printing unit 6U in the printer 1 of the embodiment is equipped with degassing units with regard to the ink supply mechanism in order to remove bubbles from the inks which are used in the heads 6*a* to 6*f*, and the printer control section 200 controls each of the sections of the ink supply mechanism, thereby appropriately executing removing of bubbles and the like. Therefore, an example of a configuration of the ink supply mechanism which is equipped in the printer 1 will be described below. Here, in a case of referring to any one head of the heads 6*a* to 6*f* without distinguishing between the heads 6*a* to 6*f*, the head 6 refers to any of the heads 6*a* to 6*f* and the ink supply mechanism will be described based on the head 6.

Figure 3:
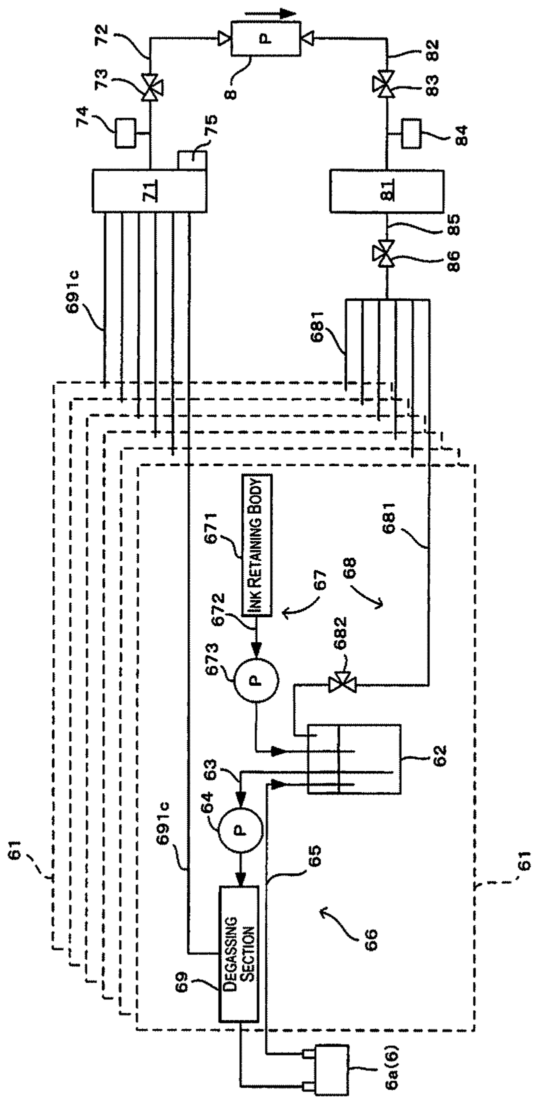
FIG. 3 illustrates a diagram schematically illustrating an example of a configuration of a supply system which supplies ink to a head.

FIG. 3 illustrates a diagram schematically illustrating an example of a configuration of a supply system which supplies ink to a head. The ink supply mechanism has ink supply sections 61 (which are equivalent to the "supply section" in the present invention), which control the supply of ink according to operation instructions from the printer control section 200, for each of the heads 6*a* to 6*f*. The ink supply sections 61 have the same basic configurations and differ only in the number of degassing units as described later. That is, the ink supply section 61 has a tank 62 (which is equivalent to the "retaining section" of the present invention) which retains ink, a supply flow path 63 (a supply tube) which connects the tank 62 and the head 6, a liquid feeding pump 64 which is provided in the supply flow path 63, and a recovery flow path 65 (a recovery tube) which connects the head 6 and the tank 62. In this manner, a circulation path 66 is formed so that the ink flows in order of the tank 62, the supply flow path 63, the head 6, the recovery flow path 65, and the tank 62. As a result, the ink circulates in the circulation path 66 due to the liquid feeding pump 64 rotating in the forward direction according to rotation instructions from the printer control section 200. That is, the ink which is retained in the tank 62 is supplied to the head 6 via the supply flow path 63 (outgoing path) using the liquid feeding pump 64 and is recovered from the head 6 to the tank 62 via the recovery flow path 65 (return path).

In addition, the ink supply section 61 has an ink replenishing mechanism 67 which performs replenishing of ink into the tank 62 and a pressure adjusting mechanism 68 which adjusts the pressure inside the tank 62. The ink replenishing mechanism 67 has an ink retaining body 671 such as an ink cartridge or an ink pack, a replenishing flow path 672 (a replenishing tube) which connects the ink retaining body 671 and the tank 62, and a replenishing pump 673 which is provided in the replenishing flow path 672. Then, the ink inside the ink retaining body 671 is replenished into the tank 62 via the replenishing flow path 672 by the replenishing pump 673 rotating in the forward direction according to replenishing instructions from the printer control section 200.

In addition, the pressure adjusting mechanism 68 has a positive pressure path (positive pressure piping) 681, which connects a pressurization buffer tank which will be described later and the tank 62, and a three way valve 682 which is provided in the positive pressure path 681. Then, the pressure inside the tank 62 is adjusted by the three way valve 682 being operated according to valve switching instructions from the printer control section 200. That is, the three way valve 682 has a function of switching between a path from a positive pressure buffer tank which will be described later to the tank 62 and a path which introduces air into the tank 62, and the three way valve 682 is able to select each of the paths according to switching instructions from the printer control section 200. When, for example, switching to the path from the positive pressure buffer tank to the tank 62, the positive pressure which is accumulated in the positive pressure buffer tank is applied to the tank 62 and the pressure inside the tank 62 increases. In contrast to this, when switching to the path which introduces air into the tank 62, the inside of the tank 62 returns to atmospheric pressure.

Furthermore, the ink supply section 61 is provided with a degassing section 69 for removing gaseous components such as bubbles which are included in the ink. That is, the degassing section 69 is provided along with the liquid feeding pump 64 in the supply flow path 63 on the downstream side with regard to the liquid feeding pump 64 in the ink supply direction and degasses the ink which is supplied to the head 6 using degassing units.

Here, the degassing sections 69 for each of the inks may have the same configuration in a case where gaseous components are included to the same degree in all of the inks, but it is desirable that the degassing capacities be different, in a case where the amounts of the gaseous components are different, according to the types (color, composition, and the like) of the inks. In the present embodiment, the degassing capacity is increased in order to use white ink for forming the background image by the number of degassing units being higher than the other degassing section 69 in the degassing section 69 for white ink. This is because white ink includes a substance with high sedimentation compared with other inks and includes more bubbles than the other inks as a result of undergoing sufficient stirring beforehand. Due to such a technical background, four degassing units 691 are used in the degassing sections 69 other than for white ink in the present embodiment, while six degassing units 691 are used only in the degassing section 69 for white ink as shown in FIGS. 4A, 4B and 4C.

Figure 4A:
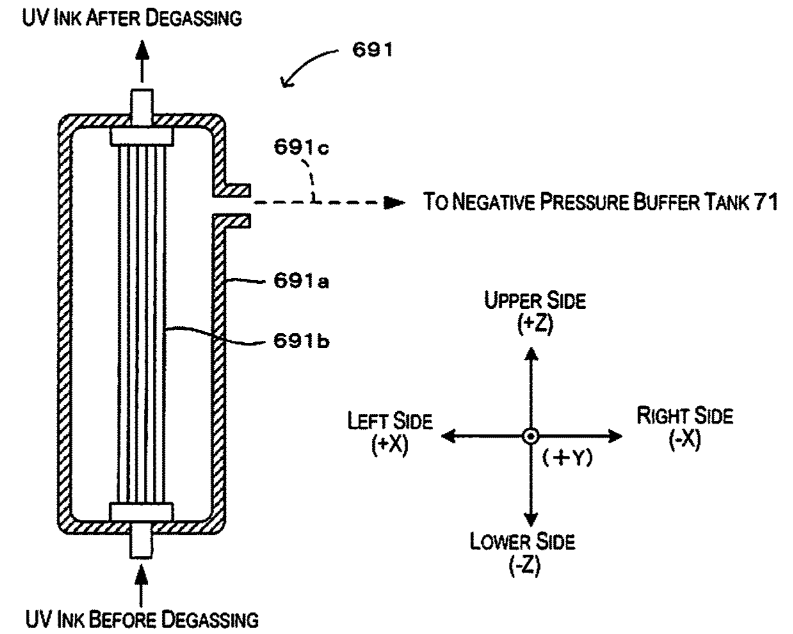
FIGS. 4A, 4B and 4C illustrate diagrams illustrating a configuration of degassing units which are included in a degassing section and an arrangement of a degassing path and a bypass path in the degassing section.
Figure 4B:
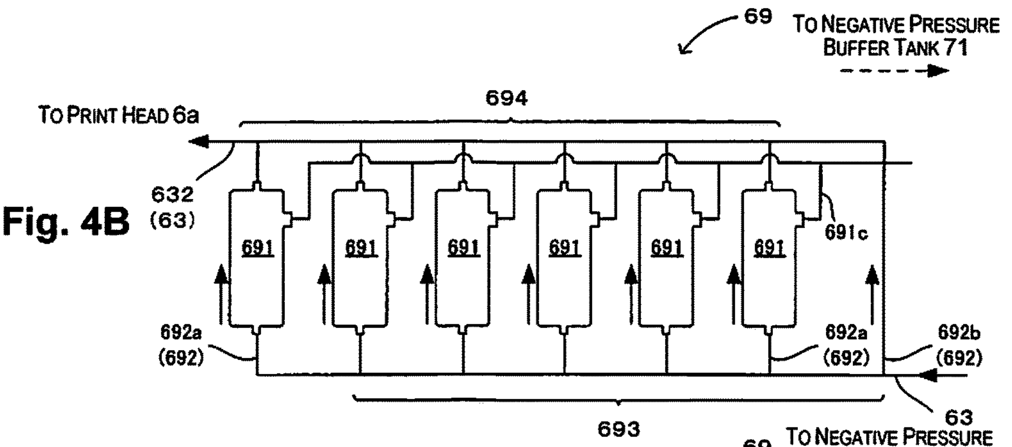
Figure 4C:
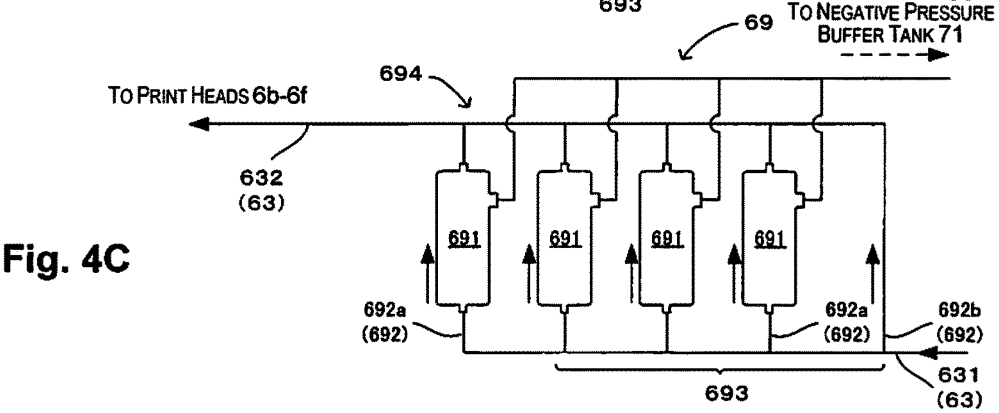

FIGS. 4A, 4B and 4C illustrate diagrams illustrating a configuration of the degassing units which are included in the degassing section and an arrangement of the degassing flow path and the bypass flow path in the degassing section. The degassing units 691 which are used in the degassing section 69 have a vacuum chamber 691*a* and a gas permeable membrane 691*b* with a tube shape as shown in FIG. 4A. In the present embodiment, the vacuum chamber 691*a* is provided to extend in the vertical direction Z and the interior space of the vacuum chamber 691*a* also extends in the direction Z. Then, a plurality of the gas permeable membranes 691*b* are arranged in the vertical direction Z in the interior space of the vacuum chamber 691*a*. The plurality of gas permeable membranes 691*b* are connected with a flow path 692 outside the vacuum chamber 691*a* and UV ink flows from the lower side to the upper side in the vertical direction Z inside the gas permeable membranes 691*b*.

In addition, the vacuum chamber 691*a* is connected with a negative pressure buffer tank which will be described later using a negative pressure supply path (negative pressure piping) 691*c* and reduces pressure via the negative pressure supply path 691*c*. As a result, due to the pressure difference inside and outside the gas permeable membranes 691*b*, the gaseous components such as bubbles, which are included in the UV ink which flows through the gas permeable membrane 691*b*, are taken out of the gas permeable membrane 691*b*. In this manner, the gaseous components are removed from the UV ink due to the UV ink flowing in the degassing units while the pressure is reduced.

Six of the degassing units 691 which are configured in this manner are used in the degassing section 69 for white ink. In more detail, the degassing section 69 for white ink as shown in FIG. 4B is inserted into the supply flow path 63, and has a branching section 693 which branches the supply flow path 63 on the tank 62 side (referred to below as the "first supply flow path 631") into seven flow paths (branch piping) 692 and a joining section 694 which joins the seven flow paths 692 into the supply flow path 63 on the head 6*a* side (referred to below as the "second supply flow path"). In the present embodiment, the flow paths 692 have the same configuration, that is, the cross sectional areas in the XY plane and the lengths in the Z direction are the same for both. As a result, after the ink which is fed from the tank 62 via the first supply flow path 631 is divided into seven ink flows and flows in each of the flow paths 692, the ink joins up in the second supply flow path 632.

The degassing units 691 which have the configuration described above are provided in six of the flow paths out of the seven flow paths 692. That is, the six of the flow paths 692 are equivalent to the "degassing flow path" of the present invention and the gaseous components which are included in the ink are removed while the ink flows in each of degassing flow paths 692*a*. On the other hand, the one remaining flow path 692 is equivalent to the "bypass flow path" of the present invention, the degassing unit 691 is not provided in a bypass flow path 692*b*, and the ink, which flows in this one of the flow paths 692, joins up without any changes with the ink, which is degassed, at the joining section 694. Here, the ink which joins up is supplied to the head 6*a* via the second supply flow path 632.

The degassing sections other than for white ink, that is, the degassing sections 69 for yellow (Y), cyan (C), magenta (M), black (K), and transparent ink have the same configurations as the degassing section 69 for white ink except that the number of the degassing flow paths 692*a* is four. That is, the degassing section 69 as shown in FIG. 4C has the branching section 693 which branches the first supply flow path 631 into five of the flow paths (branching piping) 692 and the joining section 694 which joins up the five flow paths 692 with the second supply flow path 632 on the side of the heads 6*b* to 6*f*. Then, the four flow paths 692 function as the degassing flow paths 692*a* which have the degassing units 691 with the configuration described above and the one remaining flow path 692 functions as the bypass flow path 692*b*.

Each of the degassing sections 69 which are configured in this manner is connected with the negative pressure buffer tank 71 via the negative pressure supply path 691*c* as shown in FIG. 3. The negative pressure buffer tank 71 has, for example, a cylindrical shape and it is possible to accumulate negative pressure in the interior space of the negative pressure buffer tank 71. The negative pressure buffer tank 71 is connected with a vacuum pump 8 through a negative pressure introduction path (piping) 72. In addition, a three way valve 73 is provided in the negative pressure introduction path 72. The three way valve 73 has a function of switching between the path from the negative pressure buffer tank 71 to the vacuum pump 8 and the path which introduces air into the vacuum pump 8, and the three way valve 73 is able to select each of the paths according to switching instructions from the printer control section 200. When, for example, switching to the path from the negative pressure buffer tank 71 to the vacuum pump 8, air inside the negative pressure buffer tank 71 is suctioned by the vacuum pump 8 and pressure in the interior space in the negative pressure buffer tank 71 is reduced. On the other hand, when switching to the path which introduces air into the vacuum pump 8, reducing of pressure in the negative pressure buffer tank 71 due to the vacuum pump 8 is stopped. Here, a negative pressure sensor 74 is provided in order to measure the pressure inside the negative pressure buffer tank 71. In addition, a leak sensor 75 is installed to oppose a lower part of the side surface of the negative pressure buffer tank 71 and it is possible to detect ink leaks using the leak sensor 75 when ink flows in the interior space of the negative pressure buffer tank 71.

In addition, a pressurization buffer tank 81 is provided in addition to the negative pressure buffer tank 71 in the present embodiment. The pressurization buffer tank 81 has the same structure as the negative pressure buffer tank 71 and it is possible to accumulate positive pressure in the interior space of the pressurization buffer tank 81. In other words, the pressurization buffer tank 81 is connected with the vacuum pump 8 using a pressurization introduction path (piping) 82. In addition, a three way valve 83 is provided in the pressurization introduction path 82. The three way valve 83 has a function of switching between the path from the vacuum pump 8 to the pressurization buffer tank 81 and the path where pressurization (compressed air) is taken out from the vacuum pump 8 to the atmosphere, and the three way valve 83 is able to select each of the paths according to switching instructions from the printer control section 200. When, for example, switching to the path from the vacuum pump 8 to the pressurization buffer tank 81, air is applied to the pressurization buffer tank 81 using the vacuum pump 8 and the pressure in the interior space of the pressurization buffer tank 81 increases. On the other hand, when switching to the path where pressurization is taken out from the vacuum pump 8 to the atmosphere, supplying of pressurization from the vacuum pump 8 to the pressurization buffer tank 81 is stopped. Here, a pressurization sensor 84 is provided in order to measure the pressure inside the pressurization buffer tank 81.

In addition, one end of a common pressurization path (piping) 85 is connected with the pressurization buffer tank 81. The other end of the common pressurization path 85 is branched into six paths and each of the branched paths functions as the positive pressurize path 681. Furthermore, a three way valve 86 is provided in the common pressurization path 85 and has a function of switching between the path from the pressurization buffer tank 81 to each of the ink supply sections 61 and the path where pressurization is taken out from the pressurization buffer tank 81 to the atmosphere, and the three way valve 86 is able to select each of the paths according to switching instructions from the printer control section 200. When, for example, switching to the path from the pressurization buffer tank 81 to each of the ink supply sections 61, the pressurized air inside the pressurization buffer tank 81 is supplied to each of the ink supply sections 61. On the other hand, when switching to the path where pressurized air is taken out from the pressurization buffer tank 81 to the atmosphere, supplying of pressurized air from the pressurization buffer tank 81 to each of the ink supply sections 61 is stopped.

In the printer 1 which is configured in the above manner, ink inside the tank 62 is supplied to the head 6 by the printer control section 200 controlling each of the sections of the apparatus, and forming of the background image, forming of the color image, and coating using the transparent ink are executed. In addition, the degassing sections 69 are provided for every ink and the gaseous components such as bubbles which are included in the inks are removed. Accordingly, it is possible to obtain the following operational effects.

The ink from the tank 62 is split into the degassing flow path 692*a* and the bypass flow path 692*b* in the degassing section 69 using the liquid feeding pump 64. Then, the pressure of the ink which flows in the degassing flow path 692*a* is reduced and the ink is degassed using the degassing units 691 while the ink which flows in the bypass flow path 692*b* flows without any changes without being degassed and without the pressure being reduced. Then, the ink, where degassing is finished which flows from the degassing flow path 692*a* (referred to below as "degassed ink"), joins up with the ink where degassing is not carried out which flows from the bypass flow path 692*b* (referred to below as "non-degassed ink") and is supplied to the head. In this manner, it is possible to reduce loss in pressure in an efficient manner in the degassing section 69 by providing the bypass flow path 692*b* while also degassing the ink in the degassing flow path 692*a* using the degassing section 69. The ink is reliably supplied from the tank 62 to the head by reducing loss in pressure in the degassing section 69.

In addition, oxygen inhibits radical polymerization in UV ink, and when the amount of oxygen which is dissolved in the ink is excessively low, the radical polymerization of the UV ink is promoted and the UV ink changes into foreign matter due to the radical polymerization. The foreign matter is a cause of clogging in the nozzles of the heads, which leads to ejection defects in the heads, and is a cause of jamming and wear in the liquid feeding pump 64, which shortens the life of the liquid feeding pump 64. Accordingly, it is easy for foreign matter to be generated in the techniques in the prior art where the degassing units 691 are provided in all of the flow paths which are branched from the supply flow path 63 and there are times when the problems described above are generated. In contrast to this, since a flow path which does not have the degassing unit 691, that is, the bypass flow path 692*b*, is provided in the present embodiment, foreign matter is prevented from being generated by suppressing the amount of oxygen in the ink from being excessively reduced. Accordingly, it is possible to extend the life of the liquid feeding pump 64.

In addition, there is a configuration where the number of the degassing flow paths 692*a* is larger than the number of the bypass flow paths 692*b*. Accordingly, it is possible to effectively reduce the amount of gas which is included in the ink, in other words, it is possible to increase the degree of degassing while also maintaining a low loss in pressure, and it is possible to obtain a superior degassing effect.

In addition, the number of degassing flow paths 692*a* in the degassing section 69 which degasses white ink is set to be greater than the degassing sections 69 for the inks other than white ink in the present embodiment to take into consideration that the white ink includes a substance with high sedimentation and that there is a high possibility that the gaseous components such as bubbles will be included to a greater extent than in the other inks. As a result, it is possible to sufficiently degas the white ink.

Furthermore, the ink, which flows in via the branching section 693 in the degassing flow path 692*a* and the bypass flow path 692*b* in the present embodiment, flows from the lower side (−Z) toward the upper side (+Z) in the vertical direction. Accordingly, the gaseous components which are included in the ink move to the upper side in the vertical direction and it is easy for the gaseous components to be separated by being gathered on the upper side of the flow path 692 and it is possible for promoting of degassing to be achieved. Here, the form of arrangement of the degassing flow path 692*a* and the bypass flow path 692*b* is not limited this and the degassing flow path 692*a* may be arranged to be inclined so that one end of the degassing flow path 692*a* is above the other end in the vertical direction Z. In addition, the bypass flow path 692*b* may also be arranged in the same manner as the degassing flow path 692*a*. That is, it is desirable that the degassing flow path 692*a* and the bypass flow path 692*b* be configured such that ink which is guided from the branching section 693 flows upward from below in the vertical direction Z and it is possible to increase degassing capacity due to this.

Here, the present invention is not limited to the embodiment described above and it is possible to appropriately combine elements of the embodiment described above or to add various modifications within a scope which does not depart from the spirit of the invention. For example, six of the degassing flow paths 692*a* are provided for white ink and four of the degassing flow paths 692*a* are provided for other colors in the embodiment described above, but the number of the degassing flow paths 692*a* is not limited to this and it is sufficient to provide at least one or more of the degassing flow paths 692*a*. In addition, the number of bypass flow paths 692*b* is not limited to "1" and two or more may be provided. However, it is desirable that the number of the bypass flow paths 692*b* be smaller than of the number of the degassing flow paths 692*a* in the same manner as the embodiment described above in order to secure the degassing capacity.

In addition, it is possible to appropriately change the arrangements and numbers of the heads 6 and the UV lamps and to appropriately change the shape and the like of the platen 30. In addition, it is also possible to appropriately change the specific configuration of each of the sections of the printer 1, and for example, the configuration of the head 6 may be changed from the configuration described above. In addition, the ink is circulated in the embodiment described above, but it is possible to apply the liquid ejecting technique according to the present invention with regard to printers where ink circulation is not performed.

The embodiment described above is adopted in ink jet printers which use UV ink, but the embodiment described above may be adopted in a liquid ejecting apparatus which ejects or discharges liquids other than UV ink. It is possible for the present invention to be applied to various types of liquid ejecting apparatuses which are provided with liquid ejecting heads or the like which discharge liquid droplets in minute amounts. Here, the liquid droplets refer to the state of the liquid which is discharged from the liquid ejecting apparatus described above and include liquid droplets which have a granular shape, a tear shape, and a trailing shape. In addition, here, it is sufficient if the liquids are material which is able to be ejected from the liquid ejecting head. For example, it is sufficient if the liquid droplets are in a state where a substance is in a liquid phase, and the substance may be a body with a fluid form such as a liquid body with high or low viscosity, a sol, a gel water, another inorganic solvent, an organic solvent, a solution, a liquid resin, or a liquid metal (a metal melt). In addition, states other than liquid as one state of matter are included where particles of a functional material formed of solid matter such as pigments and metal particles are dissolved, dispersed, or mixed into a solvent. In addition, typical examples of the liquids include inks, liquid crystals, and the like as described in the embodiments described above. Here, the inks encompass various types of liquid compositions such as typical water-based inks and oil-based inks, gel inks, hot melt inks, and ultraviolet curable inks. Specific examples of other liquid ejecting apparatuses may include liquid crystal displays, electroluminescence (EL) displays, surface-emitting displays, liquid ejecting apparatuses which eject liquids which include materials such as electrode materials or coloring materials which are used in the manufacturing or the like of color filters in a dispersed or dissolved form, liquid ejecting apparatuses which eject bio-organic material which is used in biochip manufacturing, liquid ejecting apparatuses which are used as precision pipettes and which eject liquids which are samples, textile printing apparatuses, micro dispensers, or the like. Furthermore, a liquid ejecting apparatus which ejects a lubricant in a pin point manner in precision machines such as watches or cameras, a liquid ejecting apparatus which forms minute hemispherical lenses (optical lenses) which are used in optical communication elements or the like, a liquid ejecting apparatus which ejects an etching liquid such as an acid or an alkali in order to etch a substrate or the like, and a liquid ejecting apparatus for textile printing which ejects a liquid onto a cloth or the like may be adopted. Then, it is possible to apply the present invention to any type of liquid ejecting apparatus out of these liquid ejecting apparatuses.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A printer comprising;

a print head configured and arranged to eject an ultraviolet curable ink;

a UV lamp configured and arranged to irradiate ultraviolet rays onto the ultraviolet curable ink that has been ejected;

a retaining section configured and arranged to retain the ultraviolet curable ink;

a degassing section with a degassing unit;

a first supply flow path through which the ultraviolet curable ink flows from the retaining section to the degassing section; and a second supply flow path through which the ultraviolet curable ink degassed in the degassing section flows to the print head, the degassing section including a degassing flow path having the degassing unit through which the ultraviolet curable ink flows while reducing pressure, a bypass flow path through which the ultraviolet curable ink flows without reducing the pressure, a branching section dividing the ultraviolet curable ink flowing in the first supply flow path into the degassing flow path and the bypass flow path, and a joining section joining the ultraviolet curable ink flowing in the degassing flow path and the ultraviolet curable ink flowing in the bypass flow path to flow in the second supply flow path.

2. The printer according to claim 1, wherein the degassing unit includes a plurality of permeable membranes, the degassing flow path is one of a plurality of degassing flow paths, and the number of the degassing flow paths is greater than the number of the bypass flow path.

3. The printer according to claim 1, further comprising a first ink supply section including the retaining section, the degassing section, the first supply flow path and the second supply flow path, the retaining section of the first ink supply section retaining white ink as the ultraviolet curable ink, and a second supply section including the retaining section, the degassing section, the first supply flow path and the second supply flow path, the retaining section of the second supply section retaining other ink than white ink as the ultraviolet curable ink, wherein the degassing flow path is one of a plurality of degassing flow paths, and the number of the degassing flow paths in the first ink supply section is greater than the number of the degassing flow paths in the second supply section.

4. The printer according to claim 1, wherein the ultraviolet curable ink that is guided from the branching section flows upward from below in a vertical direction in the degassing flow path and the bypass flow path.

5. The printer according to claim 1, wherein the ultraviolet curable ink is cured by the ultraviolet rays.

6. The printer according to claim 1, wherein the degassing flow path is one of a plurality of degassing flow paths, the bypass flow path is one of a plurality of bypass flow paths, and the number of the degassing flow paths is greater than the number of the bypass flow paths.

* * * * *